United States Patent
Liu et al.

(10) Patent No.: US 9,942,210 B2
(45) Date of Patent: Apr. 10, 2018

(54) KEY DERIVATION METHOD AND APPARATUS FOR LOCAL ACCESS UNDER CONTROL OF A CELLULAR NETWORK

(75) Inventors: Yang Liu, Beijing (CN); Dajiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/398,730

(22) PCT Filed: May 23, 2012

(86) PCT No.: PCT/CN2012/075955
§ 371 (c)(1),
(2), (4) Date: Nov. 3, 2014

(87) PCT Pub. No.: WO2013/173988
PCT Pub. Date: Nov. 28, 2013

(65) Prior Publication Data
US 2015/0121490 A1    Apr. 30, 2015

(51) Int. Cl.
*H04L 29/06* (2006.01)
*H04W 12/04* (2009.01)
(Continued)

(52) U.S. Cl.
CPC ............ *H04L 63/062* (2013.01); *H04W 12/04* (2013.01); *H04W 36/0038* (2013.01); *H04W 76/02* (2013.01); *H04W 88/06* (2013.01)

(58) Field of Classification Search
CPC .. H04L 63/0876; H04L 9/0866; H04L 9/0861
(Continued)

(56) References Cited

U.S. PATENT DOCUMENTS

2005/0135617 A1* 6/2005 Cho ...................... H04N 7/1675
380/210
2006/0013389 A1* 1/2006 Harrison .................. H04L 9/32
380/30
(Continued)

FOREIGN PATENT DOCUMENTS

CN    1482832    3/2004
CN    101610506    12/2009
(Continued)

OTHER PUBLICATIONS

Montero, "Neighbor discovery for industrial wireless sensor networks with mobile nodes", Jul. 2017, Elsevier—Computer communications, pp. 41-55.*
(Continued)

*Primary Examiner* — Gregory Lane
(74) *Attorney, Agent, or Firm* — Mintz Levin Cohn Ferris Glovsky and Popeo, P.C.

(57) ABSTRACT

A method for key derivation may comprise: generating a second key based at least in part on a first key for a first connection between a user equipment and a first network node, in response to a decision to enter an idle mode; releasing the first connection to enter the idle mode; providing an identity of the user equipment to the first network node via a second network node, in response to initiating a setup procedure for a second connection between the user equipment and a second network node; and using the second key for the second connection, in response to receiving from the second network node an indication that the identity of the user equipment is successfully verified at the first network node.

16 Claims, 5 Drawing Sheets

(51) Int. Cl.
*H04W 36/00* (2009.01)
*H04W 76/02* (2009.01)
*H04W 88/06* (2009.01)

(58) Field of Classification Search
USPC .......................................................... 726/6
See application file for complete search history.

(56) References Cited

U.S. PATENT DOCUMENTS

| | | | |
|---|---|---|---|
| 2008/0001498 A1 | 1/2008 | Muller | |
| 2008/0014981 A1* | 1/2008 | Venkatachalam ... | H04W 76/046 455/528 |
| 2008/0184032 A1 | 7/2008 | Li et al. | |
| 2010/0056156 A1 | 3/2010 | Xu et al. | |
| 2010/0070651 A1* | 3/2010 | Morikawa ............ | H04W 28/06 709/247 |
| 2011/0116629 A1 | 5/2011 | Forsberg et al. | |
| 2011/0123029 A1* | 5/2011 | Zhang .................. | H04W 12/04 380/272 |
| 2011/0128936 A1 | 6/2011 | Kim et al. | |
| 2011/0141886 A1* | 6/2011 | Lee .................... | H04L 12/5695 370/230 |
| 2011/0235802 A1 | 9/2011 | Kokkinen et al. | |
| 2012/0033815 A1 | 2/2012 | Kuo | |
| 2012/0077501 A1 | 3/2012 | Zhang et al. | |
| 2012/0177199 A1* | 7/2012 | Baek .................. | H04L 63/0428 380/270 |
| 2012/0239937 A1* | 9/2012 | Yamanaka ............ | H04L 9/3247 713/179 |
| 2013/0058484 A1* | 3/2013 | Delagrange ........ | H04N 21/2347 380/255 |
| 2015/0121490 A1 | 4/2015 | Liu et al. | |

FOREIGN PATENT DOCUMENTS

| | | |
|---|---|---|
| CN | 102209355 | 10/2011 |
| EP | 2109278 A1 | 10/2009 |
| EP | 2293610 * | 3/2011 |
| EP | 2293610 A1 | 3/2011 |

OTHER PUBLICATIONS

"3rd Generation Partnership Project;Technical Specification Group Services and System Aspects; 3G Security; Wireless Local Area Network (WLAN) inter working security (Release 11)", 3GPP TS 33.234, V11.2.0, Dec. 2011, pp. 1-99.

"3rd Generation Partnership Project;Technical Specification Group Services and System Aspects; 3GPP System Architecture Evolution (SAE); Security aspects of non-3GPP accesses(Release 11)", 3GPP TS 33.402, V11.2.0, Dec. 2011, pp. 1-52.

"3rd Generation Partnership Project; Technical Specification Group Core Network and Terminals; Numbering, addressing and identification (Release 11)", 3GPP TS 23.003, V11.0.0, Dec. 2011, pp. 1-81.

"Key Refresh on Intra-MME Handovers", 3GPP TSG SA Working Group 3 Security meeting #47, S3-070306, Agenda : SAE/LTE security, Nokia Siemens Networks, Nokia, May 22-25, 2007, pp. 1-3.

"Use of Node Identities in Key Derivations", 3GPP TSG SA Working Group 3 Meeting #48, S3-070555, Agenda : 6.14, Ericsson, Jul. 10-13, 2007, pp. 1-5.

Krawczyk et al., "HMAC: Keyed-Hashing for Message Authentication", RFC 2104, Network Working Group, Feb. 1997, pp. 1-11.

"Information Technology—Security Techniques—Hash-Functions", Part 3: Dedicated hash-functions, ISO/IEC10118-3, Mar. 1, 2004, 11 Pages.

Extended European Search Report received for corresponding European Patent Application No. 12877118.5, dated Nov. 25, 2015, 7 pages.

"Security Context Transfer for Handover Between 3GPP and Trusted Non 3GPP Networks", 3GPP TSG SA WG2 Architecture—S2#57, S2-071821, Agenda Item:8.4.3, Samsung, Apr. 23-27, 2007, 6 pages.

NPL-3GPP_TS_31.102_version-8.1.0_Release-8(Mar. 2008), 188 pages.

Chen Supplementary EP Search Report EP2293610A4, dated Apr. 8, 2011, 2 pages.

International Search Report and Written Opinion received for corresponding Patent Cooperation Treaty Application No. PCT/CN2012/075955 , dated Mar. 7, 2013, 13 pages.

* cited by examiner

KEY DERIVATION METHOD AND APPARATUS FOR LOCAL ACCESS UNDER CONTROL OF A CELLULAR NETWORK

RELATED APPLICATION

This application was originally filed as PCT Application No. PCT/CN2012/075955 filed May 23, 2012.

FIELD OF THE INVENTION

The present invention generally relates to communication networks. More specifically, the invention relates to a method and apparatus for key derivation.

BACKGROUND

The modern communications era has brought about a tremendous expansion of communication networks. Wireless and mobile networking technologies have addressed related consumer demands, while providing more flexibility and immediacy of information transfer. In a communication system such as a hybrid network where an Access Point (AP) may provide local services for a User Equipment (UE) and be connected to a Core Network (CN) through backhaul of a macro evolved Node B (eNB), the local radio access between the UE and the AP also needs protection. Thus, it is desirable to investigate a light weight solution for securing local services without degrading the security level of the local services.

SUMMARY

The present description introduces a key derivation mechanism for the local access under control of a cellular network, which can generate new Access Stratum (AS) keys in the Radio Access Network (RAN) side without consuming the Authentication Vector (AV). Moreover, this mechanism can reduce the cost for the related security procedure while aligning with the current security principle for a macro network without an involvement of the CN.

According to a first aspect of the present invention, there is provided a method comprising: generating a second key based at least in part on a first key for a first connection between a UE and a first network node, in response to a decision to enter an idle mode; releasing the first connection to enter the idle mode; providing an identity of the UE to the first network node via a second network node, in response to initiating a setup procedure for a second connection between the UE and the second network node; and using the second key for the second connection, in response to receiving from the second network node an indication that the identity of the UE is successfully verified at the first network node.

According to a second aspect of the present invention, there is provided an apparatus comprising: at least one processor; and at least one memory comprising computer program code, the at least one memory and the computer program code configured to, with the at least one processor, cause the apparatus to perform at least the following: generating a second key based at least in part on a first key for a first connection between the apparatus and a first network node, in response to a decision to enter an idle mode; releasing the first connection to enter the idle mode; providing an identity of the apparatus to the first network node via a second network node, in response to initiating a setup procedure for a second connection between the apparatus and the second network node; and using the second key for the second connection, in response to receiving from the second network node an indication that the identity of the apparatus is successfully verified at the first network node.

According to a third aspect of the present invention, there is provided a computer program product comprising a computer-readable medium bearing computer program code embodied therein for use with a computer, the computer program code comprising: code for generating a second key based at least in part on a first key for a first connection between a UE and a first network node, in response to a decision to enter an idle mode; code for releasing the first connection to enter the idle mode; code for providing an identity of the UE to the first network node via a second network node, in response to initiating a setup procedure for a second connection between the UE and the second network node; and code for using the second key for the second connection, in response to receiving from the second network node an indication that the identity of the UE is successfully verified at the first network node.

According to a fourth aspect of the present invention, there is provided an apparatus comprising: generating means for generating a second key based at least in part on a first key for a first connection between the apparatus and a first network node, in response to a decision to enter an idle mode; releasing means for releasing the first connection to enter the idle mode; providing means for providing an identity of the apparatus to the first network node via a second network node, in response to initiating a setup procedure for a second connection between the apparatus and the second network node; and using means for using the second key for the second connection, in response to receiving from the second network node an indication that the identity of the apparatus is successfully verified at the first network node.

In an exemplary embodiment, said decision to enter the idle mode may comprise sending to the first network node an indication that the UE decides to enter the idle mode. In another exemplary embodiment, said generating the second key based at least in part on the first key may comprise: determining a set of input parameters for deriving the second key; and generating the second key by applying a predefined key derivation algorithm with the first key and the set of input parameters. For example, the set of input parameters may comprise at least one of: an index associated with the predefined key derivation algorithm, an identifier of the UE, and a length of an identifier of the UE. In accordance with an exemplary embodiment, said providing the identity of the UE to the first network node may comprise: receiving a request message for the identity of the UE from the second network node; and sending a response message comprising the identity of the UE to the second network node for forwarding to the first network node. In accordance with another exemplary embodiment, said using the second key for the second connection may comprise: generating one or more security keys for a service over the second connection, based at least in part on the second key.

According to a fifth aspect of the present invention, there is provided a method comprising: generating a second key based at least in part on a first key for a first connection between a UE and a first network node, in response to receiving an indication that the UE decides to enter an idle mode; releasing the first connection; verifying an identity of the UE obtained from a second network node; and sending to the second network node the second key for a second connection between the UE and the second network node, in response to a successful verification of the identity of the UE.

According to a sixth aspect of the present invention, there is provided an apparatus comprising: at least one processor; and at least one memory comprising computer program code, the at least one memory and the computer program code configured to, with the at least one processor, cause the apparatus to perform at least the following: generating a second key based at least in part on a first key for a first connection between a UE and the apparatus, in response to receiving an indication that the UE decides to enter an idle mode; releasing the first connection; verifying an identity of the UE obtained from another apparatus; and sending to the another apparatus the second key for a second connection between the UE and the another apparatus, in response to a successful verification of the identity of the UE.

According to a seventh aspect of the present invention, there is provided a computer program product comprising a computer-readable medium bearing computer program code embodied therein for use with a computer, the computer program code comprising: code for generating a second key based at least in part on a first key for a first connection between a UE and a first network node, in response to receiving an indication that the UE decides to enter an idle mode; code for releasing the first connection; code for verifying an identity of the UE obtained from a second network node; and code for sending to the second network node the second key for a second connection between the UE and the second network node, in response to a successful verification of the identity of the UE.

According to an eighth aspect of the present invention, there is provided an apparatus comprising: generating means for generating a second key based at least in part on a first key for a first connection between a UE and the apparatus, in response to receiving an indication that the UE decides to enter an idle mode; releasing means for releasing the first connection; verifying means for verifying an identity of the UE obtained from another apparatus; and sending means for sending to the another apparatus the second key for a second connection between the UE and the another apparatus, in response to a successful verification of the identity of the UE.

According to exemplary embodiments, the apparatus in the sixth/eighth aspect of the present invention may comprise a first network node, and the another apparatus in the sixth/eighth aspect of the present invention may comprise a second network node. In accordance with an exemplary embodiment, said generating the second key based at least in part on the first key may comprise: determining a set of input parameters for deriving the second key; and generating the second key by applying a predefined key derivation algorithm with the first key and the set of input parameters. For example, the set of input parameters may comprise at least one of: an index associated with the predefined key derivation algorithm, an identifier of the UE, and a length of an identifier of the UE. In an exemplary embodiment, the successful verification of the identity of the UE may comprise retrieving the second key associated with the identity of the UE successfully. In another exemplary embodiment, there may be a security association between the first network node and the second network node.

According to a ninth aspect of the present invention, there is provided a method comprising: obtaining an identity of a UE from the UE, in response to initiating a setup procedure for a second connection between the UE and a second network node; forwarding the identity of the UE to a first network node; receiving from the first network node a message comprising a second key for the second connection, the message indicating that the identity of the UE is successfully verified at the first network node, wherein the second key is generated based at least in part on a first key for a first connection between the UE and the first network node; and informing the UE that the identity of the UE is successfully verified at the first network node.

According to a tenth aspect of the present invention, there is provided an apparatus comprising: at least one processor; and at least one memory comprising computer program code, the at least one memory and the computer program code configured to, with the at least one processor, cause the apparatus to perform at least the following: obtaining an identity of a UE from the UE, in response to initiating a setup procedure for a second connection between the UE and the apparatus; forwarding the identity of the UE to another apparatus; receiving from the another apparatus a message comprising a second key for the second connection, the message indicating that the identity of the UE is successfully verified at the another apparatus, wherein the second key is generated based at least in part on a first key for a first connection between the UE and the another apparatus; and informing the UE that the identity of the UE is successfully verified at the another apparatus.

According to a eleventh aspect of the present invention, there is provided a computer program product comprising a computer-readable medium bearing computer program code embodied therein for use with a computer, the computer program code comprising: code for obtaining an identity of a UE from the UE, in response to initiating a setup procedure for a second connection between the UE and a second network node; code for forwarding the identity of the UE to a first network node; code for receiving from the first network node a message comprising a second key for the second connection, the message indicating that the identity of the UE is successfully verified at the first network node, wherein the second key is generated based at least in part on a first key for a first connection between the UE and the first network node; and code for informing the UE that the identity of the UE is successfully verified at the first network node.

According to a twelfth aspect of the present invention, there is provided an apparatus comprising: obtaining means for obtaining an identity of a UE from the UE, in response to initiating a setup procedure for a second connection between the UE and the apparatus; forwarding means for forwarding the identity of the UE to another apparatus; receiving means for receiving from the another apparatus a message comprising a second key for the second connection, the message indicating that the identity of the UE is successfully verified at the another apparatus, wherein the second key is generated based at least in part on a first key for a first connection between the UE and the another apparatus; and informing means for informing the UE that the identity of the UE is successfully verified at the another apparatus.

According to exemplary embodiments, the apparatus in the tenth/twelfth aspect of the present invention may comprise a second network node, and the another apparatus in the tenth/twelfth aspect of the present invention may comprise a first network node. In accordance with exemplary embodiments, the second network node may further generate one or more security keys for a service over the second connection based at least in part on the second key.

In exemplary embodiments of the present invention, the provided methods, apparatus, and computer program products can enable a local network node such as an AP to obtain one or more security keys for local traffics without consuming any AV. Therefore, the cost and complexity of a communication system such as a hybrid network can be reduced and the good compatibility with the current security principle may be maintained.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Along with the development of radio communication networks such as LTE system, high-speed data services have been treated as one of the most important requirements. Especially for a Local Area Network (LAN), higher data rate is expected from a user's perspective. How to provide local services with high speed data rate has become a hot topic in 3GPP (3rd Generation Partnership Project).

A new architecture called as Local Area Evolution (LAE) is designed aiming to deploy a local area system providing high performance on peak data rate, cell capacity, Quality of Service (QoS) guarantee, interference management, etc. Besides, low cost and high energy efficiency are also expected for a LAE system. In the LAE system, Support Node (SN) concept is introduced and it is a network element located in the core network, providing some support/control/maintenance functionalities to the LAE system. A Base Station (BS) is located in the RAN side which provides a local area network, just like Home evolved Node B (HeNB) in LTE system. A UE may establish a connection with a macro eNB and/or another connection with a LAE BS. The macro network connection is more stable and more carefully managed so that the UE could not easily lose its connection, while the LAE connection is there more for providing high speed data services and some characteristic services in a local area. Another architecture called as LTE-LAN is also researched to compete with world-wide popular Wireless Fidelity (WiFi) technique. LTE-LAN is basically assumed to be based on LTE technology but is more focused on some local area use cases and scenarios, and it has much similarity with the LAE concept. LTE-LAN is also expected to provide high performance local services for users with low cost. A BS in LAE architecture may be considered as an Access Point (AP) in LTE-LAN system. LTE-LAN and LTE macro network are independent networks which may operate in different bands. So far, an X2-like or S1-like interface may be introduced between different APs and between an AP and an eNB, since a lot of features (for example carrier aggregation, interference management, etc.) would be developed with this interface. In addition, one feasible architecture option may be that an AP works under a macro eNB (like a sub-system of the eNB) and the AP may be connected to the CN through backhaul of the macro eNB (for example, reusing a S1-like interface of the eNB to the CN), which means that there may be no direct interface between the AP and the CN, and that the eNB to which the AP connects may act as a concentrator in the RAN side. Under this architecture, when the AP is deployed by the same network operator as the macro network and the network operator decides to reuse an existing LTE security mechanism for local services supported by the AP, too much signaling burden and complexity may be introduced to the entire system.

In the hybrid network as described above, the local radio access between a UE and an AP also needs protection. If a non-3GPP security mechanism is used (which may happen for example if the hybrid network such as LTE-Hi is deployed by a third party), the security level of local services would be degraded, which may bring a potential security risk for a local area network. On the other hand, if an existing 3GPP security mechanism such as Extensible Authentication Protocol-Authentication and Key Agreement (EAP-AKA) is reused, the cost for a related security procedure may be too high. Particularly, the CN may also be involved frequently during performing the security mechanism, which may have too much burden on the CN. In other words, the cost of implementing a related security procedure for a local area network may be too high if a pre-configured key or certificate for an existing security mechanism is used for a hybrid network. For example, in the specifications such as 3GPP TS33.234 and TS33.402, there is a solution using EAP-AKA to derive keys used for a local link. However, the cost of this solution may be too much for a LTE-Hi system. Since the cost is one of the most important key performance indicators of a communication system, it is desirable to investigate a light weight solution without degrading the security level of local services.

According to exemplary embodiments, a novel solution is provided to protect a radio link between a UE and a local network node such as an AP. The solution designs a key derivation mechanism for the local access under control of a cellular network. For example, the designed key derivation mechanism may generate new AS keys in the RAN side using a new set of inputs to a key derivation function without consuming any AV. Moreover, this solution can reduce the cost for the related security procedure while aligning with the current security principle for a macro network without an involvement of the CN. More details of the solution proposed in the present invention will be illustrated hereinafter by way of example with reference to the accompanying drawings.

Figure 1:
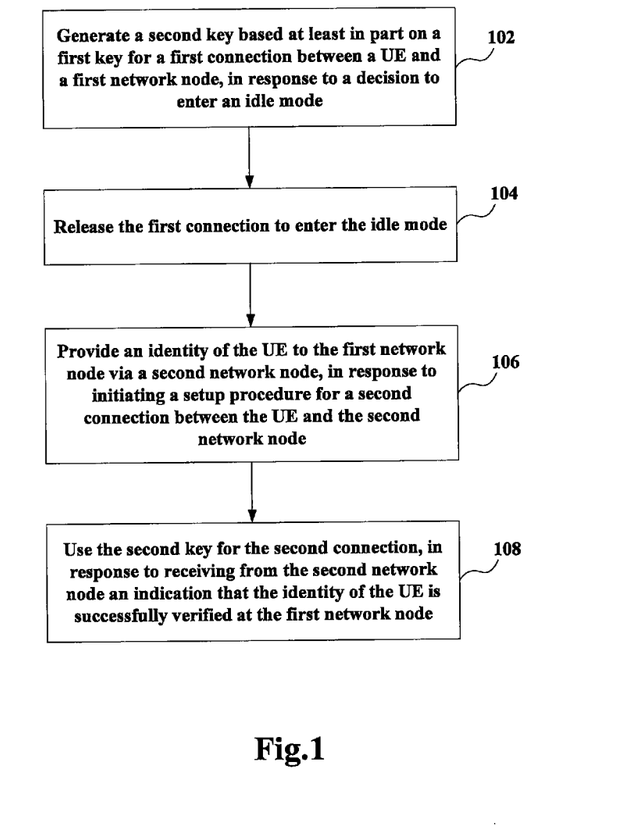
FIG. 1 is a flowchart illustrating a method for key derivation, which may be performed at a UE in accordance with embodiments of the present invention.

FIG. 1 is a flowchart illustrating a method for key derivation, which may be performed at a UE (such as a mobile station, a wireless terminal, a personal digital assistant (PDA), a portable device and the like) in accordance with embodiments of the present invention. The solution according to exemplary embodiments may be applicable to a communications network such as LTE-LAN, LAE and any other suitable hybrid network where a UE may establish respective radio connections with a macro network node (such as an eNB/BS/control center and the like) and a local network node (such as an AP/BS/control center and the like). For example, the UE may be served by a first network node (such as an eNB) through a first connection, and a first key for the first connection may be shared between the UE and the first network node. When one or more services and/or traffics over the first connection ended, the UE may enter an idle mode for example by releasing the first connection with the first network node. In response to a decision to enter an idle mode, the UE may generate a second key based at least in part on the first key for the first connection between the UE and the first network node, as shown in block 102. For example, the UE may send an indication to the first network node, indicating that the UE decides to enter the idle mode. In an exemplary embodiment, the second key (such as $K_{AP}$) may be generated by determining a set of input parameters for deriving the second key and applying a predefined key derivation algorithm with the first key (such as $K_{eNB}$) and the set of input parameters. For example, the predefined key derivation algorithm may comprise Keyed-Hashing for Message Authentication (KHAC) as specified in the Internet Engineering Task Force (IETF) Request for Comments (RFC) 2104, Security techniques—Hash-functions (SHA) as specified in the International Organization for Standardization/International Electrotechnical Commission (ISO/IEC) 10118-3, other suitable security mechanism, and/or any combination thereof. The set of input parameters for deriving the second key may comprise at least one of: an index (such as a sequence number, an identifier and the like) associated with the predefined key derivation algorithm, an identifier (such as Cell Radio Network Temporary Identifier (C-RNTI), International Mobile Subscriber Identity (IMSI), Media Access Control (MAC) address and so on) of the UE, and a length of an identifier of the UE (which may depend on the selected identifier of the UE). The generated second key may be stored by the UE. In block 104, the UE may release the first connection to enter the idle mode. When a service supported by a second network node (such as an AP) is desired by the UE, a connection setup procedure may be initiated between the UE and the second network node. In response to initiating a setup procedure for a second connection between the UE and the second network node, the UE may provide an identity of the UE to the first network node via the second network node, as shown in block 106. For example, the UE may receive a request message for the identity of the UE from the second network node, and send a response message comprising the identity of the UE to the second network node for forwarding to the first network node. The first network node may verify the identity of the UE as illustrated with respect to FIG. 2, for example using the identity of the UE to retrieve an associated key previously generated for the second connection. In response to receiving from the second network node an indication that the identity of the UE is successfully verified at the first network node, the UE may use the second key for the second connection, as shown in block 108. In an exemplary embodiment, the UE may generate one or more security keys for a service over the second connection, based at least in part on the second key. For example, the one or more security keys may be utilized for ciphering and integrity check for the local service and/or traffic.

Figure 2:
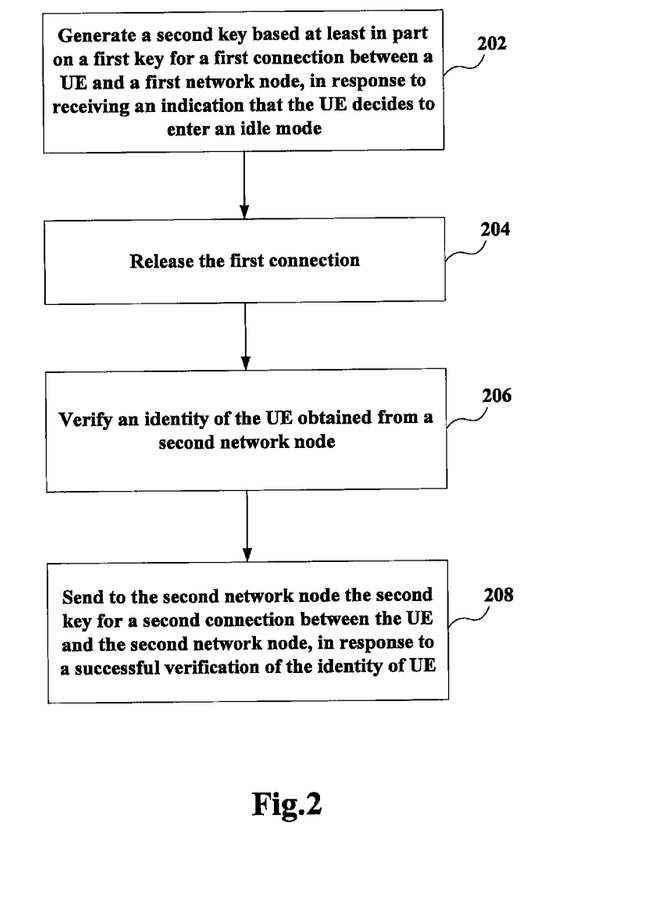
FIG. 2 is a flowchart illustrating a method for key derivation, which may be performed at a first network node in accordance with embodiments of the present invention.

FIG. 2 is a flowchart illustrating a method for key derivation, which may be performed at a first network node (such as an eNB/BS/control center and the like) in accordance with embodiments of the present invention. Corresponding to the description with respect to FIG. 1, the first network node may have a first connection with a UE and share a first key for the first connection with the UE. When services and/or traffics over the first connection ended, the UE may enter an idle mode for example by releasing the first connection with the first network node. In response to receiving an indication that the UE decides to enter the idle mode, the first network node may generate a second key based at least in part on the first key for the first connection between the UE and the first network node, as shown in block 202. According to exemplary embodiments, the second key (such as $K_{AP}$) may be generated in the same way as that used at the UE. For example, the first network node may determine a set of input parameters for deriving the second key, and generate the second key by applying a predefined key derivation algorithm with the first key (such as $K_{eNB}$) and the set of input parameters. As described with respect to FIG. 1, the predefined key derivation algorithm may comprise KHAC, SHA, other suitable security mechanism, and/or any combination thereof. The set of input parameters for deriving the second key may comprise at least one of: an index associated with the predefined key derivation algorithm, an identifier of the UE, and a length of an identifier of the UE. In an exemplary embodiment, the predefined key derivation algorithm may comprise a Key Derivation Function (KDF) expressed as $K_{AP}$=HMAC-SHA-256(x, y), where x and y are arguments of the function, and HMAC-SHA-256 represents a specified SHA associated with HMAC. Particularly, argument x may be set as the first key (such as $K_{eNB}$) shared between the UE and the first network node, and argument y may be set as a certain calculation result (such as a logic calculation result) of the determined set of input parameters. The generated second key may be stored by the first network node. In block 204, the first network node may release the first connection, for example, due to services over the first connection ended. When a local service from a second network node (such as an AP) is desired by the UE, a connection setup procedure may be initiated between the UE and the second network node. In accordance with exemplary embodiments, the second network node may work under the first network node, for example like a sub-system of the first network node. The second network node may be connected to a CN through backhaul of the first network node, for example by reusing a S1-like interface of the first network node to the CN. In this scenario, there may be no direct interface between the second network node and the CN, and the first network node may act as a concentrator in the RAN side. Particularly, the first network node and the second network node may have been authenticated by each other and a security association may be established between them. When the connection setup procedure is initiated between the UE and the second network node, the second network node may get an identity of the UE and forward it to the first network node. The first network node may verify the identity of the UE obtained from the second network node, as shown in block 206. In an exemplary embodiment, the previously generated second key stored at the first network node may be indexed by an identity of the corresponding UE. Thus, the identity of the UE obtained from the second network node may be used to retrieve the associated second key. In block 208, the first network node may send to the second network node the second key for a second connection between the UE and the second network node, in response to a successful verification of the identity of the UE. In an exemplary embodiment, the successful verification of the identity of the UE may comprise retrieving the second key associated with the identity of the UE successfully.

Figure 3:
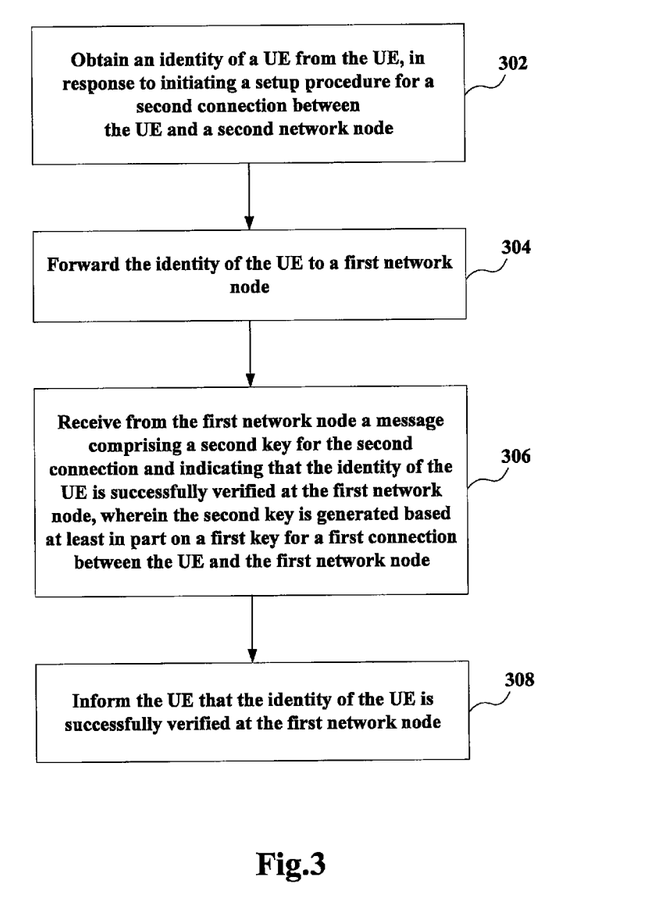
FIG. 3 is a flowchart illustrating a method for key derivation, which may be performed at a second network node in accordance with embodiments of the present invention.

FIG. 3 is a flowchart illustrating a method for key derivation, which may be performed at a second network node (such as an APBS/control center and the like) in accordance with embodiments of the present invention. Corresponding to the descriptions with respect to FIG. 1 and FIG. 2, when a service supported by the second network node is desired by a UE which has released a first connection with a first network node, a connection setup procedure may be initiated between the UE and the second network node. It is noted that the UE and the first network node may have respective second keys generated as described with respect to FIG. 1 and FIG. 2. In response to initiating the setup procedure for a second connection between the second network node and the UE, the second network node may obtain an identity of the UE from the UE, as shown in block 302. According to an exemplary embodiment, the second network node may send an EAP request/identity to the UE and receive an EAP response/identity from the UE to get the identity of the UE. In block 304, the second network node may forward the identity of the UE to the first network node. As mentioned with respect to FIG. 2, the first network node may use the identity of the UE to retrieve an associated second key as a result of successful verification of the identity of the UE. Then the second network node may receive from the first network node a message comprising a second key for the second connection, the message indicating that the identity of the UE is successfully verified at the first network node, as shown in block 306. As detailed in FIG. 1 and FIG. 2, the second key (such as $K_{AP}$) may be generated based at least in part on a first key (such as $K_{eNB}$) for a first connection between the UE and the first network node. In block 308, the second network node may inform the UE that the identity of the UE is successfully verified at the first network node. For example, the second network node may send an EAP success message to the UE. Based at least in part on the second key obtained from the first network node, the second network node may generate one or more security keys for a service over the second connection. As mentioned with respect to FIG. 1, the one or more security keys may be utilized for ciphering and integrity check for the local service and/or traffic between the UE and the second network node. It can be seen that the above key derivation for the local service and/or traffic consumes no AV and avoids involvement of the CN. The second key used for protecting the second connection can be generated at the first network node by using the first key for the first connection between the UE and the first network node, and then provided to the second network node from the first network node. This procedure can be aligned well with the current macro network security principle, and make the security level of a local network at least not lower than that of a macro network.

The various blocks shown in FIGS. 1-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. The solution provided by the present invention can use a key for a macro network to derive a key for protecting a radio link in a local network. For example, an eNB may derive $K_{AP}$ from $K_{eNB}$ using a new set of inputs to a new defined KDF, and send it to a LTE-Hi AP. A UE which shares $K_{eNB}$ with the eNB may also derive $K_{AP}$ from $K_{eNB}$ using the same approach as the eNB. Then the LTE-Hi AP and the UE can further generate security keys for local services by using $K_{Ap}$. In other words, the key derivation mechanism proposed for the local access under control of a cellular network in accordance with exemplary embodiments can generate new AS keys in the RAN side without consuming any AV. Therefore, the cost and complexity of a communication system such as a hybrid network can be reduced and the good compatibility with the current security principle may be maintained.

Figure 4:
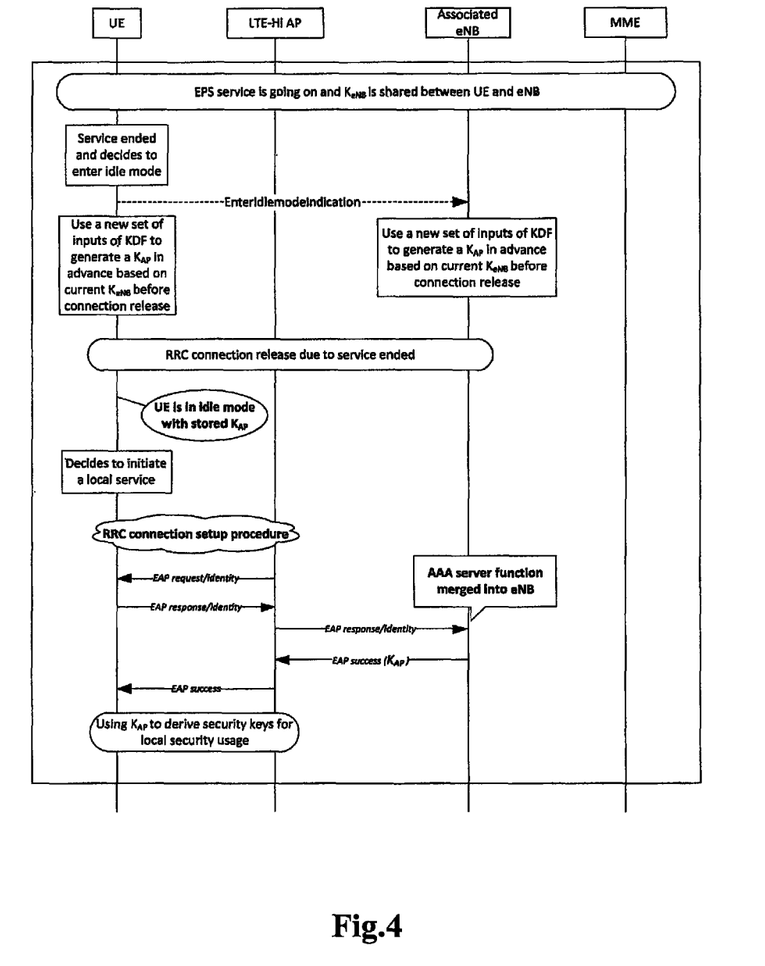
FIG. 4 shows an exemplary local service establishment with a Long Term Evolution (LTE) security mechanism in accordance with an embodiment of the present invention.

FIG. 4 shows an exemplary local service establishment with a LTE security mechanism in accordance with an embodiment of the present invention. In the scenario illustrated in FIG. 4, a UE may be served by an eNB with a macro service or by a LTE-Hi AP with a local service. The LTE-Hi AP and the eNB may have been authenticated by each other and there may be a security association (for example, Internet Protocol Security (IPsec) protected link) between them. As illustrated in FIG. 4, an Evolved Packet System (EPS) service may be going on and $K_{eNB}$ can be shared between the UE and the eNB. When the desired service from the eNB ended, the UE may indicate to the eNB that it decides to enter an idle mode. In accordance with an exemplary embodiment, the eNB may use a predefined key derivation algorithm (for example, using a new set of inputs of a KDF) to generate in advance a key (such as $K_{AP}$) for a connection to be established between the UE and the AP based at least in part on the currently shared key (such as $K_{eNB}$), before a connection between the UE and the eNB is released. For example, a new type of KDF (which may be different from any existing KDF) defined with a new set of inputs may be utilized to generate $K_{AP}$ for the local area security. As described with respect to FIGS. 1-3, the new set of inputs may comprise at least one of: an index associated with the predefined key derivation algorithm (which may be denoted as "FC" and assigned with a hexadecimal number like 0xxx or in any other scale), an identifier (such as C-RNTI, IMSI, MAC address and so on) of the UE (which may be denoted as "P0"), and a length of an identifier of the UE (which may be denoted as "L0"). These parameters (FC, P0 and L0) together with $K_{eNB}$ can be provided as inputs to generate $K_{AP}$ by using this new type of KDF designed for the predefined key derivation algorithm. For example, let an intermediate variable S=FC||P0||L0, $K_{AP}$ may be calculated by the following function: $K_{AP}$=HMAC-SHA-256($K_{eNB}$, S), where HMAC-SHA-256 is a security algorithm complying with the specifications of IETF RFC 2104 and ISO/IEC 10118-3. Correspondingly, the UE can also generate $K_{AP}$ in advance by using the same method and principle as the eNB, and store it for a next local service access procedure. Then the connection (such as RRC connection) can be released between the UE and the associated eNB, as shown in FIG. 4. The UE may decide to initiate an RRC connection setup procedure with the AP due to a service requirement for a local area. In this case, the UE may initiate the RRC connection setup procedure to the AP, and an EAP procedure may be initiated among the UE, the AP and the associated eNB for the key shared between the UE and the AP. For example, the LTE-Hi AP may send an EAP Request/Identity message to the UE, and the UE may send an EAP Response/Identity message as a response. The UE can send an identity complying with a Network Access Identifier (NAI) format as specified in 3GPP TS23.003, or an identity known by the eNB. The EAP Response/Identity message may be routed by the LTE-Hi AP towards the eNB or an AAA (Authentication, Authorization and Accounting) Server adjunct with the eNB. According to an exemplary embodiment, the function of AAA can be merged into the eNB, which can concentrate the function in the same network node instead of an ad-hoc deployment in different local area networks and save the deployment cost in the local area. Alternatively, the function of AAA can be implemented by an AAA server separated from the eNB. If the $K_{AP}$ associated with the UE can be retrieved in the eNB or the AAA Server adjunct with the eNB, then the eNB may retrieve the $K_{Ap}$ indexed by the UE's identity and send the retrieved $K_{AP}$ in an EAP success message to the LTE-Hi AP for local security usage. When the UE receives the EAP success message forwarded by the LTE-Hi AP, it can use previously derived $K_{AP}$ to generate further security keys (for example, based at least in part on legacy cellular security rules) for ciphering and integrity check for a local service and/or traffic. Correspondingly, the LTE-Hi AP can also apply the same $K_{AP}$ obtained from the eNB for the local service and/or traffic. It can be seen that the whole procedure consumes no AV and avoids an involvement of the CN but is aligned with the current macro network security principle.

Figure 5:
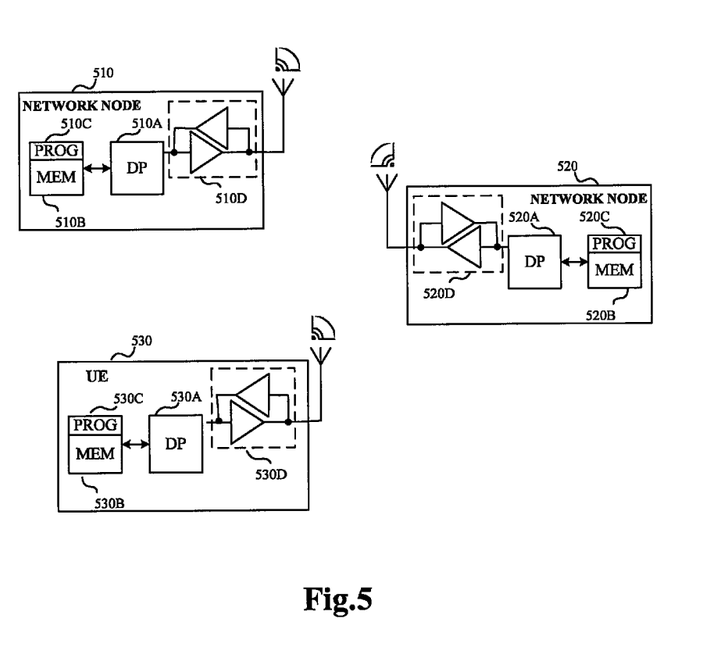
FIG. 5 is a simplified block diagram of various apparatuses which are suitable for use in practicing exemplary embodiments of the present invention.

FIG. 5 is a simplified block diagram of various apparatuses which are suitable for use in practicing exemplary embodiments of the present invention. In FIG. 5, a UE 530 (such as mobile phone, wireless terminal, portable device, PDA, multimedia tablet, and etc.) may be adapted for communicating with one or more network nodes such as a first network node 510 and a second network node 520. The first network node 510 (such as an eNB/BS/control center, etc.) and the second network node 520 (such as an AP/BS/control center, etc.) may be adapted for communicating with each other directly or through an intermediate entity (not shown in FIG. 5). In an exemplary embodiment, the UE 530 may comprise a data processor (DP) 530A, a memory (MEM) 530B that stores a program (PROG) 530C, and a suitable transceiver 530D for communicating with an apparatus such as another UE, a network node, a server and so on. The first network node 510 may comprise a data processor (DP) 510A, a memory (MEM) 510B that stores a program (PROG) 510C, and a suitable transceiver 510D for communicating with an apparatus such as the second network node 520, a UE 530 or a network entity (not shown in FIG. 5). Similarly, the second network node 520 may comprise a data processor (DP) 520A, a memory (MEM) 520B that stores a program (PROG) 520C, and a suitable transceiver 520D for communicating with an apparatus such as the first network node 510, the UE 530 or a network entity (not shown in FIG. 5). For example, at least one of the transceivers 510D, 520D, 530D may be an integrated component for transmitting and/or receiving signals and messages. Alternatively, at least one of the transceivers 510D, 520D, 530D may comprise separate components to support transmitting and receiving signals/messages, respectively. The respective DPs 510A, 520A and 530A may be used for processing these signals and messages.

Alternatively or additionally, the first network node 510, the second network node 520 and the UE 530 may comprise various means and/or components for implementing functions of the foregoing steps and methods in FIGS. 1-4. For example, the UE 530 may comprise: generating means for generating a second key based at least in part on a first key for a first connection between the UE and a first network node (such as the first network node 510), in response to a decision to enter an idle mode; releasing means for releasing the first connection to enter the idle mode; providing means for providing an identity of the UE to the first network node via a second network node (such as the second network node 520), in response to initiating a setup procedure for a second connection between the UE and the second network node; and using means for using the second key for the second connection, in response to receiving from the second network node an indication that the identity of the UE is successfully verified at the first network node. In an exemplary embodiment, the first network node 510 may comprise: generating means for generating a second key based at least in part on a first key for a first connection between a UE (such as the UE 530) and the first network node, in response to receiving an indication that the UE decides to enter an idle mode; releasing means for releasing the first connection; verifying means for verifying an identity of the UE obtained from a second network node (such as the second network node 520); and sending means for sending to the second network node the second key for a second connection between the UE and the second network node, in response to a successful verification of the identity of the UE. In another exemplary embodiment, the second network node 520 may comprise: obtaining means for obtaining an identity of a UE from the UE (such as the UE 530), in response to initiating a setup procedure for a second connection between the UE and the second network node; forwarding means for forwarding the identity of the UE to a first network node (such as the first network node 510); receiving means for receiving from the first network node a message comprising a second key for the second connection, the message indicating that the identity of the UE is successfully verified at the first network node, wherein the second key is generated based at least in part on a first key for a first connection between the UE and the first network node; and informing means for informing the UE that the identity of the UE is successfully verified at the first network node.

At least one of the PROGs 510C, 520C, 530C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 510A of the first network node 510, by the DP 520A of the second network node 520 and by the DP 530A of the UE 530, or by hardware, or by a combination of software and hardware.

The MEMs 510B, 520B and 530B may be of any type suitable to the local technical environment and may be implemented using any suitable data storage technology, such as semiconductor based memory devices, flash memory, magnetic memory devices and systems, optical memory devices and systems, fixed memory and removable memory. The DPs 510A, 520A and 530A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. An apparatus, comprising:
at least one processor; and
at least one memory comprising computer program code, the at least one memory and the computer program code configured to, with the at least one processor, cause the apparatus to perform at least the following:
generate, in response to a decision to enter an idle mode, a second key based at least in part on a first key, the first key used to secure data transmitted over a first connection between the apparatus and a first network node, wherein the generation of the second key comprises application of a predefined key derivation algorithm using the first key and a set of input parameters for deriving the second key;
provide an identity of the apparatus to the first network node via a second network node, in response to initiation of a setup procedure for a second connection between the apparatus and the second network node; and
use the second key for the second connection, in response to receipt from the second network node of an indication that the identity of the apparatus is successfully verified at the first network node.

2. The apparatus according to claim 1, wherein said decision to enter the idle mode comprises the apparatus being configured to at least send, to the first network node, an indication that the apparatus has decided to enter the idle mode.

3. The apparatus according to claim 1, wherein the set of input parameters comprises at least one of: an index associated with the predefined key derivation algorithm, an identifier of the apparatus, and a length of the identifier of the apparatus.

4. The apparatus according to claim 1, wherein the provision of the identity of the apparatus to the first network node comprises the apparatus being configured to at least:
receive a request message for the identity of the apparatus from the second network node; and
send a response message comprising the identity of the apparatus to the second network node for forwarding to the first network node.

5. The apparatus according to claim 1, wherein the utilization of the second key for the second connection comprises the apparatus being configured to at least:
generate, based at least in part on the second key, one or more security keys for a service over the second connection.

6. A non-transitory computer-readable medium including computer program code which when executed by at least one processor causes operations comprising:
generating, in response to a decision to enter an idle mode, a second key, based at least in part on a first key, the first key used to secure data transmitted over a first connection between a user equipment and a first network node, wherein generating the second key comprises applying a predefined key derivation algorithm using the first key and a set of input parameters for deriving the second key;
providing an identity of the user equipment, to the first network node via a second network node, in response to initiating a setup procedure for a second connection between the user equipment and the second network node; and
using the second key for the second connection, in response to receiving from the second network node an indication that the identity of the user equipment is successfully verified at the first network node.

7. The non-transitory computer-readable medium according to claim 6, wherein said decision to enter the idle mode comprises: sending to the first network node an indication that the user equipment has decided to enter the idle mode.

8. The non-transitory computer-readable medium according to claim 6, wherein the set of input parameters comprises at least one of: an index associated with the predefined key derivation algorithm, an identifier of the user equipment, and a length of the identifier of the user equipment.

9. The non-transitory computer-readable medium according to claim 6, wherein providing the identity of the user equipment to the first network node comprises:
receiving a request message for the identity of the user equipment from the second network node; and sending a response message comprising the identity of the user equipment to the second network node for forwarding to the first network node.

10. The non-transitory computer-readable medium according to claim 6, wherein said using the second key for the second connection comprises: generating, based at least in part on the second key, one or more security keys for a service over the second connection.

11. An apparatus, comprising:
at least one processor; and
at least one memory comprising computer program code,
the at least one memory and the computer program code configured to, with the at least one processor, cause the apparatus to perform at least the following:
generate, in response to receiving an indication that a user equipment has decided to enter an idle mode, a second key based at least in part on a first key, the first key used to secure data transmitted over a first connection between the user equipment and the apparatus, wherein the generation of the second key comprises application of a predefined key derivation algorithm using the first key and a set of input parameters for deriving the second key;
verify an identity of the user equipment obtained from another apparatus; and
send, in response to a successful verification of the identity of the user equipment and to the other apparatus, the second key, the second key used to secure data transmitted over a second connection between the user equipment and the other apparatus.

12. The apparatus according to claim 11, wherein the set of input parameters comprises at least one of: an index associated with the predefined key derivation algorithm, an identifier of the user equipment, and a length of the identifier of the user equipment.

13. The apparatus according to claim 11, wherein the successful verification of the identity of the user equipment comprises successfully retrieving the second key associated with the identity of the user equipment.

14. The apparatus according to claim 11, wherein there is a security association between the apparatus and the other apparatus.

15. The apparatus according to claim 1, wherein the second network node is connected to a core network through a backhaul of the first network node.

16. The apparatus according to claim 1, wherein the first network node is a macro evolved node B and the second network node is a local access point associated with the first network node.

\* \* \* \* \*